US009741495B2

(12) United States Patent
Fujii

(10) Patent No.: US 9,741,495 B2
(45) Date of Patent: Aug. 22, 2017

(54) SOLID ELECTROLYTIC CAPACITOR INCLUDING PILLOW MEMBER HAVING EDGE OVERLAPPING RECESSED PORTION OR THROUGH HOLE, AND PRODUCTION METHOD THEREFOR

(71) Applicant: Panasonic Intellectual Property Management Co., Ltd., Osaka (JP)

(72) Inventor: Eizo Fujii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 132 days.

(21) Appl. No.: 14/663,293

(22) Filed: Mar. 19, 2015

(65) Prior Publication Data

US 2015/0194269 A1 Jul. 9, 2015

Related U.S. Application Data

(63) Continuation of application No. PCT/JP2013/005717, filed on Sep. 26, 2013.

(30) Foreign Application Priority Data

Sep. 28, 2012 (JP) .................................. 2012-217238

(51) Int. Cl.
*H01G 9/048* (2006.01)
*H01G 9/012* (2006.01)
(Continued)

(52) U.S. Cl.
CPC ............ *H01G 9/048* (2013.01); *B32B 37/04* (2013.01); *B32B 37/12* (2013.01); *B32B 37/18* (2013.01);
(Continued)

(58) Field of Classification Search
CPC ............ H01G 9/048; H01G 2/06; H01G 9/10; H01G 9/15; H01G 9/012; H01G 9/08; H01G 9/0029
See application file for complete search history.

(56) References Cited

U.S. PATENT DOCUMENTS 6,972,943 B2 * 12/2005 Kato ...................... H01G 9/012
257/E23.043
9,007,743 B2 * 4/2015 Kawai .................... H01G 9/012
361/523
(Continued)

FOREIGN PATENT DOCUMENTS

JP 01037006 A * 2/1989
JP 2008270317 A * 11/2008
(Continued)

OTHER PUBLICATIONS

International Search Report of PCT application No. PCT/JP2013/005717 dated Nov. 12, 2013.

*Primary Examiner* — David M Sinclair
(74) *Attorney, Agent, or Firm* — McDermott Will & Emery LLP

(57) ABSTRACT

A solid electrolytic capacitor comprising a capacitor element disposed on an insulating substrate, in which a positive electrode lead-out structure electrically connected to a positive electrode member of the capacitor element comprises a first positive electrode connection member disposed on the insulating substrate, a positive electrode terminal disposed on the insulating substrate, a pillow member configured to electrically connect the positive electrode member to the first positive electrode connection member, and a positive electrode bonding member. The first positive electrode connection member has a recessed portion or a through hole. The positive electrode bonding member partially enters the recessed portion or the through hole, and is in contact with (Continued)

an edge of a bottom surface of the pillow member at a position above the recessed portion or the through hole, or at the nearby position.

6 Claims, 10 Drawing Sheets

(51) Int. Cl.

| | | |
|---|---|---|
| *H01G 9/15* | (2006.01) | |
| *B32B 37/04* | (2006.01) | |
| *B32B 37/12* | (2006.01) | |
| *B32B 37/18* | (2006.01) | |
| *B32B 38/00* | (2006.01) | |
| *H01G 9/00* | (2006.01) | |
| *H01G 9/10* | (2006.01) | |
| *H01G 2/06* | (2006.01) | |
| *H01G 9/08* | (2006.01) | |

(52) U.S. Cl.
CPC .......... *B32B 38/0004* (2013.01); *H01G 2/06* (2013.01); *H01G 9/0029* (2013.01); *H01G 9/012* (2013.01); *H01G 9/10* (2013.01); *H01G 9/15* (2013.01); *B32B 2457/16* (2013.01); *H01G 9/08* (2013.01); *Y10T 156/1064* (2015.01)

(56) References Cited

U.S. PATENT DOCUMENTS

2011/0292626 A1* 12/2011 Kawai .................. H01G 9/012
    361/782
2012/0262847 A1    10/2012 Kawai et al.

FOREIGN PATENT DOCUMENTS

| JP | 2010-123728 | 6/2010 |
| JP | 2010-287642 | 12/2010 |
| JP | 2012-231120 | 11/2012 |
| JP | 2012222262 A * | 11/2012 |

* cited by examiner

SOLID ELECTROLYTIC CAPACITOR INCLUDING PILLOW MEMBER HAVING EDGE OVERLAPPING RECESSED PORTION OR THROUGH HOLE, AND PRODUCTION METHOD THEREFOR

RELATED APPLICATIONS

This application is a Continuation of International Application No. PCT/JP2013/005717, filed on Sep. 26, 2013, which in turn claims priority from Japanese Patent Application No. 2012-217238, filed on Sep. 28, 2012, the contents of all of which are incorporated herein by reference in their entireties.

TECHNICAL FIELD

The present disclosure relates to a solid electrolytic capacitor comprising a capacitor element disposed on an insulating substrate, and more particularly to a solid electrolytic capacitor characterized by an electrode structure formed on an insulating substrate.

BACKGROUND

FIG. 21 is a cross-sectional view illustrating one example of a conventional solid electrolytic capacitor (refer to Unexamined Japanese Patent Publication No. 2010-123728, for example). As illustrated in FIG. 21, the solid electrolytic capacitor comprises capacitor element 101 and insulating substrate 102, and capacitor element 101 is disposed on an upper surface of insulating substrate 102. Capacitor element 101 has positive electrode lead 103 and positive electrode body 113 serving as a positive electrode member, electrolytic layer 114 and negative electrode layer 104 serving as a negative electrode member, and dielectric member 115 interposed between the positive electrode member and the negative electrode member. On the upper surface of insulating substrate 102, positive electrode connection member 105 and negative electrode connection member 106 are disposed separately from each other. On a lower surface of insulating substrate 102, positive electrode terminal 107 and negative electrode terminal 108 are disposed separately from each other. Furthermore, insulating substrate 102 has positive electrode conductive via 109 and negative electrode conductive via 110 each formed by making a hole penetrating from the upper surface to the lower surface and filling the hole with a conductive material. Positive electrode conductive via 109 electrically connects positive electrode connection member 105 to positive electrode terminal 107, and negative electrode conductive via 110 electrically connects negative electrode connection member 106 to negative electrode terminal 108. In addition, positive electrode connection member 105 and positive electrode lead 103 are electrically connected to each other with pillow member 111 interposed therebetween. Furthermore, negative electrode connection member 106 and negative electrode layer 104 are electrically connected to each other with conductive paste 112 interposed therebetween.

Pillow member 111 shown in FIG. 21 is disposed on a main surface of positive electrode connection member 105 before capacitor element 101 is disposed on the upper surface of insulating substrate 102. At this time, pillow member 111 is bonded to positive electrode connection member 105 with conductive bonding member 116.

SUMMARY

A solid electrolytic capacitor according to the present disclosure comprises an insulating substrate having an upper surface and a lower surface, a capacitor element disposed on the upper surface of the insulating substrate, a positive electrode lead-out structure, and a negative electrode lead-out structure. The capacitor element has a positive electrode member, a negative electrode member, and a dielectric member. The positive electrode lead-out structure has a positive electrode terminal formed on the lower surface of the insulating substrate and is electrically connected to the positive electrode member of the capacitor element. The negative electrode lead-out structure has a negative electrode terminal formed on the lower surface of the insulating substrate and is electrically connected to the negative electrode member of the capacitor element. The positive electrode lead-out structure further comprises a first positive electrode connection member, a second positive electrode connection member, a pillow member, and a positive electrode bonding member. The first positive electrode connection member has a main surface and a back surface, and the back surface is in contact with the upper surface of the insulating substrate. Thus, the first positive electrode connection member has a recessed portion formed by locally recessing the main surface, or a through hole penetrating from the main surface to the back surface. The second positive electrode connection member electrically connects the first positive electrode connection member to the positive electrode terminal. The pillow member has a top surface and a bottom surface, and electrically connects the positive electrode member of the capacitor element to the first positive electrode connection member. The positive electrode bonding member bonds the pillow member to the first positive electrode connection member. Thus, the positive electrode bonding member partially enters the recessed portion or the through hole in the first positive electrode connection member, and is in contact with an edge of the bottom surface of the pillow member at a position above the recessed portion or the through hole, or at the nearby position.

According to the solid electrolytic capacitor, the recessed portion or the through hole is provided at a position where the pillow member is to be disposed. The positive electrode bonding member partially enters the recessed portion or the through hole, and the edge of the bottom surface of the pillow member is disposed at the position above the recessed portion or the through hole, or at the nearby position. In this way, the position of the pillow member is prevented from being largely displaced from the position where the pillow member is to be disposed. Therefore, according to the solid electrolytic capacitor, the positive electrode member of the capacitor element and the pillow member can be surely connected to each other, so that the electrical connection defect is hardly generated between these members.

According to a preferable specific configuration of the solid electrolytic capacitor, the bottom surface of the pillow member has a polygonal shape having plural corners and plural sides, and the recessed portion or the through hole is formed in the first positive electrode connection member at a position that overlaps with the corner with respect to at least two corners among the plural corners. Alternatively, or in addition to this, the recessed portion or the through hole is formed in the first positive electrode connection member at a position that overlaps with the side with respect to at least two sides among the plural sides.

According to another preferable specific configuration of the solid electrolytic capacitor, the second positive electrode connection member is a conductive via penetrating the insulating substrate from the upper surface to the lower surface, and the recessed portion or the through hole in the first positive electrode connection member is disposed above the conductive via.

A manufacturing method according to the present disclosure is a method for manufacturing a solid electrolytic capacitor comprising an insulating substrate having an upper surface and a lower surface, a capacitor element disposed on the upper surface of the insulating substrate, a positive electrode lead-out structure, and a negative electrode lead-out structure. Here, the capacitor element has a positive electrode member, a negative electrode member, and a dielectric member. The positive electrode lead-out structure has a positive electrode terminal formed on the lower surface of the insulating substrate and is electrically connected to the positive electrode member of the capacitor element. The negative electrode lead-out structure has a negative electrode terminal formed on the lower surface of the insulating substrate and is electrically connected to the negative electrode member of the capacitor element. According to the manufacturing method, a first positive electrode connection member is formed on the upper surface of the insulating substrate, and a recessed portion formed by locally recessing a main surface of the first positive electrode connection member or a through hole penetrating the first positive electrode connection member from the main surface to a back surface. Subsequently, a bonding agent containing a conductive material is applied to the main surface of the first positive electrode connection member. After that, a pillow member is disposed on the first positive electrode connection member. At this time, a bottom surface of the pillow member comes in contact with the bonding agent, and an edge of the bottom surface of the pillow member overlaps with the recessed portion or the through hole in the first positive electrode connection member. After that, the conductive material is melted by heating the bonding agent.

According to the manufacturing method, a predetermined position in which the pillow member is to be disposed is defined by positions of the recessed portions or the through holes. However, when the pillow member is disposed on the first positive electrode connection member, the pillow member could be displaced from the predetermined position. According to the manufacturing method, when the conductive material is melted by heating the bonding agent, the melted conductive material flows into an inside of the recessed portion or the through hole, so that the melted conductive material flows in the bonding agent. Thus, due to this flow, the pillow member receives forces in various directions along the main surface of first positive electrode connection member. When the position of the pillow member roughly coincides with the predetermined position, the forces applied to the pillow member cancel each other out, and as a result, the pillow member is maintained in the predetermined position. Meanwhile, when the position of the pillow member is displaced from the predetermined position, the force applied in a direction displaced from the predetermined position is smaller than the force applied in its opposite direction. As a result, the pillow member is drawn to the predetermined position, and the position of the pillow member roughly coincides with the predetermined position. Thus, the positive electrode member of the capacitor element is surely in contact with the pillow member and as a result, an electrical connection defect is hardly generated between them in the manufactured solid electrolytic capacitor.

According to a preferable specific configuration of the manufacturing method, the conductive material contained in the bonding agent has wettability in a melted state with respect to the first positive electrode connection member. Thus, when the conductive material is melted by heating the bonding agent, the melted conductive material gets wet and spreads along the main surface of the first positive electrode connection member, and is likely to flow into the inside of the recessed portion or the through hole formed in the first positive electrode connection member. As a result, the melted conductive material is likely to flow in the bonding agent.

DESCRIPTION OF EMBODIMENT

Figure 1:
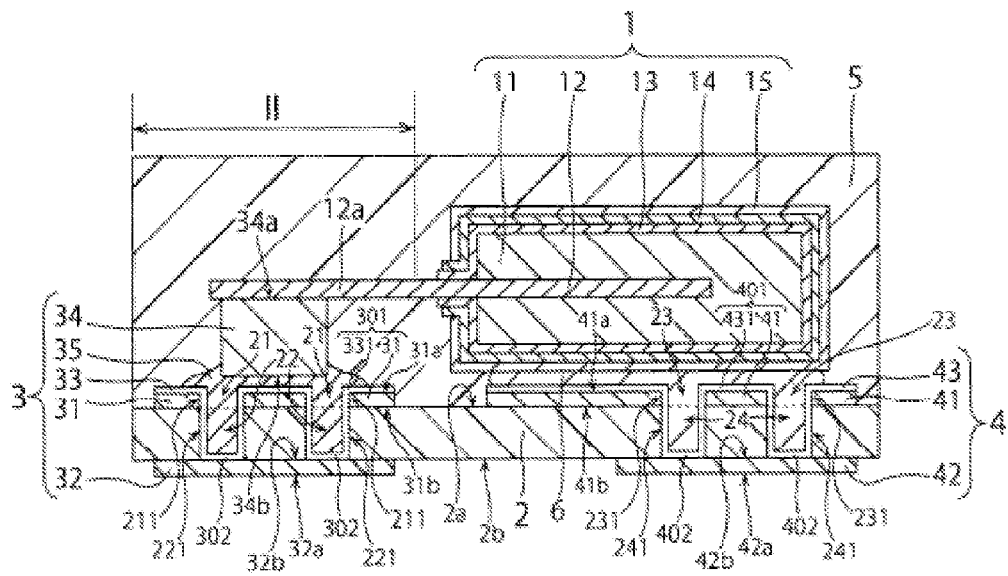
FIG. 1 is a cross-sectional view illustrating a solid electrolytic capacitor according to a first exemplary embodiment of the present disclosure.

Problems which exemplary embodiments of this disclosure intend to solve are as follows.

According to a conventional technique, when pillow member 111 is connected to positive electrode connection member 105 with conductive bonding member 116, a position of pillow member 111 is likely to be displaced from a predetermined position in which pillow member 111 is to be disposed. Here, this predetermined position means a position at which positive electrode lead 103 surely comes in contact with pillow member 111 when capacitor element 101 is disposed on insulating substrate 102. Recently, as the solid electrolytic capacitor is miniaturized, pillow member 111 becomes small in size, and the above displacement noticeably occurs. Therefore, after capacitor element 101 has been disposed on the upper surface of insulating substrate 102, an electrical connection defect is likely to be generated between positive electrode lead 103 and pillow member 111.

Thus, the present disclosure provides a solid electrolytic capacitor that hardly generates an electrical connection defect between a positive electrode member of a capacitor element and a pillow member, and a method for manufacturing the same.

FIG. 1 is a cross-sectional view illustrating a solid electrolytic capacitor according to a first exemplary embodiment of the present disclosure. As illustrated in FIG. 1, the solid electrolytic capacitor comprises capacitor element 1, insulating substrate 2, positive electrode lead-out structure 3, negative electrode lead-out structure 4, and exterior body 5.

Capacitor element 1 has positive electrode body 11, positive electrode lead 12, dielectric layer 13, electrolytic layer 14, and negative electrode layer 15. Positive electrode body 11 is configured to be a conductive porous sintered body. Positive electrode lead 12 is configured to be a conductive wire. Positive electrode lead 12 is embedded into positive electrode body 11, and a part (lead-out portion 12a) of positive electrode lead 12 is drawn out of an outer peripheral surface of positive electrode body 11.

As a conductive material for positive electrode body 11 and positive electrode lead 12, the same kind or different kinds of materials are used. The conductive material includes a valve metal such as titanium (Ti), tantalum (Ta), aluminum (Al), or niobium (Nb). Especially, titanium (Ti), tantalum (Ta), aluminum (Al), or niobium (Nb) is a suitable material to be used because its oxide (dielectric layer 13) has a high dielectric constant. Furthermore, the conductive material may be an alloy including at least two kinds of valve metals, an alloy including the valve metal and another material, or an alloy containing the valve metal as its major component.

Dielectric layer 13 is formed on a surface of positive electrode body 11 composed of the conductive material. More specifically, dielectric layer 13 is an oxide film formed by oxidizing the surface of the positive electrode body 11 composed of the conductive material. Therefore, dielectric layer 13 is formed on an outermost peripheral surface of positive electrode body 11, and on inner peripheral surfaces of fine holes formed in positive electrode body 11. In FIG. 1, dielectric layer 13 is schematically illustrated to be formed only on the outermost peripheral surface of positive electrode body 11.

Electrolytic layer 14 is formed on a surface of dielectric layer 13. More specifically, electrolytic layer 14 is formed on an outermost peripheral surface of dielectric layer 13, and over inner surfaces of the fine holes in positive electrode body 11. The examples of electrolytic layer 14 are an electrolytic material including a conductive inorganic material such as manganese dioxide, and a conductive organic material such as tetracyano-quinodimethane (TCNQ) complex salt or conductive polymer. Furthermore, the electrolytic material is not limited to the conductive inorganic material and the conductive organic material, and includes various kinds of materials.

Negative electrode layer 15 is formed on an outermost peripheral surface of electrolytic layer 14. More specifically, negative electrode layer 15 comprises a carbon layer (not shown) formed on the outermost peripheral surface of electrolytic layer 14, and a silver paint layer (not shown) formed on an outer peripheral surface of the carbon layer. In addition, negative electrode layer 15 is not limited to this, and any kind of material may be used as long as negative electrode layer 15 has an electricity collecting function.

As described above, positive electrode body 11 and positive electrode lead 12 serve as a positive electrode member of capacitor element 1, electrolytic layer 14 and negative electrode layer 15 serve as a negative electrode member of capacitor element 1, and dielectric layer 13 serves as a dielectric member of capacitor element 1. Furthermore, the positive electrode member may be a metal foil sheet or metal plate composed of the above valve metal.

Insulating substrate 2 is a flat substrate composed of an electrical insulating material such as polyimide or glass epoxy, and has upper surface 2a and lower surface 2b. Capacitor element 1 is disposed on upper surface 2a in such a manner that an extending direction of positive electrode lead 12 becomes parallel to upper surface 2a.

Positive electrode lead-out structure 3 is an electrode structure that leads a positive electrode current path connecting positive electrode lead 12 to lower surface 2b of insulating substrate 2. More specifically, positive electrode lead-out structure 3 has positive electrode connection layer 31, positive electrode terminal 32, positive electrode plated layer 33, pillow member 34, and positive electrode bonding member 35. Positive electrode connection layer 31 is disposed on upper surface 2a of insulating substrate 2, and has back surface 31b that is in contact with upper surface 2a. Positive electrode terminal 32 is disposed on lower surface 2b of insulating substrate 2, and has back surface 32b that is in contact with lower surface 2b. In addition, a metal foil sheet or metal plate composed of a metal material is user for each of positive electrode connection layer 31 and positive electrode terminal 32. Furthermore, a plated layer may be formed on main surface 32a of positive electrode terminal 32.

Positive electrode connection layer 31 has plural through holes of positive electrode connection layer 211 penetrating from main surface 31a to back surface 31b. In addition, insulating substrate 2 has plural through holes of insulating substrate 221 penetrating from upper surface 2a to lower surface 2b. Thus, through hole of insulating substrate 221 reaches back surface 32b of positive electrode terminal 32. Here, each through hole of positive electrode connection layer 211 is formed above each through hole of insulating substrate 221. Therefore, through hole of positive electrode connection layer 211 and through hole of insulating substrate 221 are connected to each other. In addition, according to this exemplary embodiment, diameters of through hole of positive electrode connection layer 211 and through hole of insulating substrate 221 are each preferably 50 μm to 150 μm.

Positive electrode plated layer 33 is formed on main surface 31a of positive electrode connection layer 31, an inner surface of through hole of positive electrode connection layer 211, an inner surface of through hole of insulating substrate 221, and back surface 32b of positive electrode terminal 32 that is in contact with through hole of insulating substrate 221. Thus, first positive electrode connection member 301 of positive electrode lead-out structure 3 comprises positive electrode connection layer 31, and a portion 331 in positive electrode plated layer 33 that is formed on main surface 31a of positive electrode connection layer 31 and on the inner surface of through hole of positive electrode connection layer 211. In addition, a positive electrode conductive via comprises a portion in positive electrode plated layer 33 formed on the inner surface of through hole of insulating substrate 221 and back surface 32b of positive electrode terminal 32, and this positive electrode conductive via serves as second positive electrode connection member 302 of positive electrode lead-out structure 3. Thus, second positive electrode connection member 302 electrically connects first positive electrode connection member 301 to positive electrode terminal 32. In this way, first positive electrode connection member 301 has plural first through holes 21 penetrating from its main surface (a main surface of positive electrode plated layer 33) to its back surface (back surface 31b of positive electrode connection layer 31). In addition, second positive electrode connection member 302 has first recessed portion 22, and an inner side of first recessed portion 22 links to first through hole 21 provided above. Furthermore, positive electrode plated layer 33 includes a material having high conductivity such as copper. In addition, according to this exemplary embodiment, a thickness of positive electrode plated layer 33 is preferably 2 μm to 20 μm, and positive electrode plated layer 33 is formed so as not to completely seal through hole of positive electrode connection layer 211 and through hole of insulating substrate 221.

Pillow member 34 is interposed between lead-out portion 12a of positive electrode lead 12 and first positive electrode connection member 301, and has top surface 34a electrically connected to lead-out portion 12a, and bottom surface 34b electrically connected to first positive electrode connection member 301. Consequently, pillow member 34 electrically connects positive electrode lead 12 to first positive electrode connection member 301.

Figure 2:
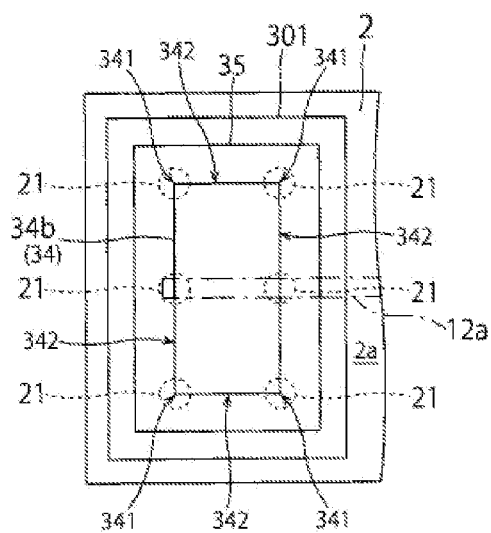
FIG. 2 is a top view of a region II illustrated in FIG. 1.

Here, a positional relation between pillow member 34 and first through holes 21 is described with reference to FIGS. 1 and 2. FIG. 2 is a top view of region II illustrated in FIG. 1. In addition, exterior body 5 is not illustrated in FIG. 2. As illustrated in FIGS. 1 and 2, pillow member 34 has a rectangular parallelepiped shape, and bottom surface 34b of pillow member 34 has a rectangular shape having four corners 341 and four sides 342. Furthermore, first positive electrode connection member 301 has six first through holes 21, in which four first through holes 21 are formed to overlap with four corners 341, and two first through holes 21 are formed to overlap with two sides 342. Furthermore, two sides 342 among four sides 342 extend parallel to each other in a direction roughly perpendicular to the extending direction of positive electrode lead 12.

According to the present disclosure, the positional relation between pillow member 34 and first through holes 21 is not limited to the above relation. For example, one or more first through holes 21 may be formed to overlap with at least one of four corners 341 and four sides 342. That is, the present disclosure includes a relation in which only one first through hole 21 overlaps with corner 341 or side 342, and a relation in which two or more first through holes 21 overlap with one side 342. However, in order to make the position of pillow member 34 coincide with predetermined position P with high precision in a sixth process in an electrode forming step that are described below, it is preferable that at least two corners 341 among four corner 341 overlaps with first through holes 21 whose number corresponds to the number of corners 341, or at least two sides 342 among four sides 342 overlap with first through holes 21 whose number corresponds to the number of sides 342.

Furthermore, the shape of bottom surface 34b of pillow member 34 is not limited to the rectangular shape, and it may be any kind of polygonal shape having a plurality of corners and a plurality of sides. Furthermore, the shape of bottom surface 34b of pillow member 34 may have a curved portion such as a rounded polygonal shape, circular shape, or oval shape. In this case, one or more first through holes 21 are preferably formed to overlap with the curved portion.

Positive electrode bonding member 35 bonds pillow member 34 to first positive electrode connection member 301. More specifically, positive electrode bonding member 35 partially enters first through holes 21, and is in contact with corners 341 or sides 342 of bottom surface 34b of pillow member 34, above first through holes 21. In addition, according to this exemplary embodiment, positive electrode bonding member 35 also partially enters first recessed portions 22 through first through holes 21.

Positive electrode bonding member 35 includes a conductive material containing a solder as a main component. More specifically, positive electrode bonding member 35 includes a conductive material having wettability in a melted state with respect to first positive electrode connection member 301. According to this exemplary embodiment, a main surface of first positive electrode connection member 301 is provided as positive electrode plated layer 33. Therefore, the solder is the conductive material having high wettability in a melted state with respect to positive electrode plated layer 33 (a main surface of first positive electrode connection member 301).

Negative electrode lead-out structure 4 is an electrode structure that leads a negative electrode current path connecting negative electrode layer 15 to lower surface 2b of insulating substrate 2. More specifically, positive electrode lead-out structure 4 has negative electrode connection layer 41, negative electrode terminal 42, and negative electrode plated layer 43. Negative electrode connection layer 41 is disposed on upper surface 2a of insulating substrate 2 separately from positive electrode connection layer 31, and has back surface 41b that is in contact with upper surface 2a. Negative electrode terminal 42 is disposed on lower surface 2b of insulating substrate 2 separately from positive electrode terminal 32, and has back surface 42b that is in contact with lower surface 2b. In addition, a metal foil sheet or metal plate composed of a metal material is used for each of negative electrode connection layer 41 and negative electrode terminal 42. Furthermore, a plated layer may be formed on main surface 42a of negative electrode terminal 42.

Negative electrode connection layer 41 has plural through holes of negative electrode connection layer 231 penetrating from main surface 41a to back surface 41b. In addition, insulating substrate 2 has plural through holes of insulating substrate 241 penetrating from upper surface 2a to lower surface 2b. Thus, through hole of insulating substrate 241 reaches back surface 42b of negative electrode terminal 42. Here, each through hole of negative electrode connection layer 231 is formed above each through hole of insulating substrate 241. Therefore, through hole of negative electrode connection layer 231 and through hole of insulating substrate 241 are connected to each other. In addition, according to this exemplary embodiment, diameters of through hole of negative electrode connection layer 231 and through hole of insulating substrate 241 are each preferably 50 µm to 150 µm.

Negative electrode plated layer 43 is formed on main surface 41a of negative electrode connection layer 41, an inner surface of through hole of negative electrode connection layer 231, an inner surface of through hole of insulating substrate connection layer 241, and back surface 42b of negative electrode terminal 42 that is in contact with through hole of insulating substrate 241. Thus, first negative electrode connection member 401 of negative electrode lead-out structure 4 comprises negative electrode connection layer 41, and a portion 431 in negative electrode plated layer 43 formed on main surface 41a of negative electrode connection layer 41 and the inner surface of through hole of negative electrode connection layer 231. In addition, a negative electrode conductive via comprises a portion in negative electrode plated layer 43 formed on the inner surface of through hole of insulating substrate 241 and back surface 42b of negative electrode terminal 42, and this negative electrode conductive via serves as second negative electrode connection member 402 of negative electrode lead-out structure 4. Thus, second negative electrode connection member 402 electrically connects first negative electrode connection member 401 to negative electrode terminal 42. In this way, first negative electrode connection member 401 has plural second through holes 23 penetrating from its main surface (a main surface of negative electrode plated layer 43) to its back surface (back surface 41b of negative electrode connection layer 41). In addition, second negative electrode connection member 402 has second recessed portions 24, and an inner side of second recessed portion 24 links to second through hole 23 provided above. Furthermore, negative electrode plated layer 43 includes a material having high conductivity such as copper. In addition, according to the exemplary embodiment, a thickness of negative electrode plated layer 43 is preferably 2 µm to 20 µm, and negative electrode plated layer 43 is formed so as not to completely seal through hole of negative electrode connection layer 231 and through hole of insulating substrate 241.

Capacitor element 1 is connected to positive electrode lead-out structure 3 and negative electrode lead-out structure 4 as follows. That is, lead-out portion 12a of positive electrode lead 12 is welded to top surface 34a of pillow member 34, so that positive electrode lead 12 and pillow member 34 are electrically connected to each other. In addition, negative electrode layer 15 and first negative electrode connection member 401 are electrically connected to each other through conductive paste 6 interposed between them.

Exterior body 5 covers capacitor element 1 on upper surface 2a of insulating substrate 2. Meanwhile, exterior body 5 is not formed on lower surface 2b of insulating substrate 2. Thus, main surface 32a of positive electrode terminal 32 and main surface 42a of negative electrode terminal 42 constitute lower surface electrodes of the solid electrolytic capacitor. Furthermore, exterior body 5 includes an electrical insulating material functioning as a sealing material such as an epoxy resin or silicone resin.

According to the solid electrolytic capacitor, while an edge (corners 341 or sides 342) of bottom surface 34b of pillow member 34 overlaps with first through holes 21, bottom surface 34b mostly overlaps with the main surface of first positive electrode connection member 301 (the flat main surface of positive electrode plated layer 33) except for a formation region of the first through hole 21. Therefore, pillow member 34 is fixed on first positive electrode connection member 301 with positive electrode bonding member 35 interposed between them. As a result, pillow member 34 hardly inclines.

Next, a detailed description is given to a method for manufacturing the solid electrolytic capacitor according to the first exemplary embodiment. According to this exemplary embodiment, an electrode forming step, an element disposing step, and an exterior body forming step are executed in this order. In the electrode forming step, positive electrode lead-out structure 3 and negative electrode lead-out structure 4 are formed, and first to sixth processes are performed.

Figure 3:
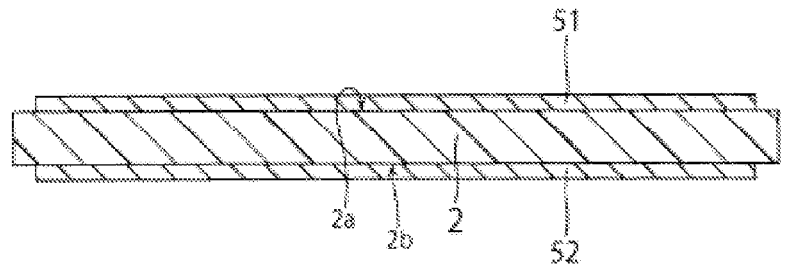
FIG. 3 is a cross-sectional view to be used for describing a first process in an electrode forming step to be executed by a method for manufacturing the solid electrolytic capacitor according to the first exemplary embodiment.

FIG. 3 is a cross-sectional view to be used for describing the first process in the electrode forming step. As illustrated in FIG. 3, in the first process, metal foil sheets 51 and 52 including a metal material such as copper are attached to upper surface 2a and lower surface 2b of insulating substrate 2, respectively. In addition, instead of metal foil sheets 51 and 52, metal plates may be attached to upper surface 2a and lower surface 2b of insulating substrate 2.

Figure 4A:
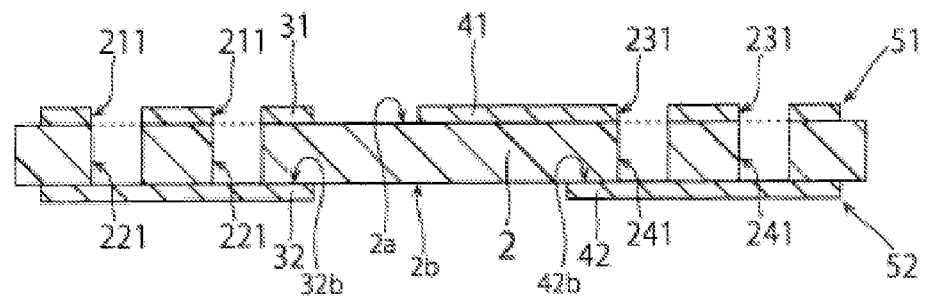
FIG. 4A is a cross-sectional view to be used for describing a second process in the electrode forming step.
Figure 4B:
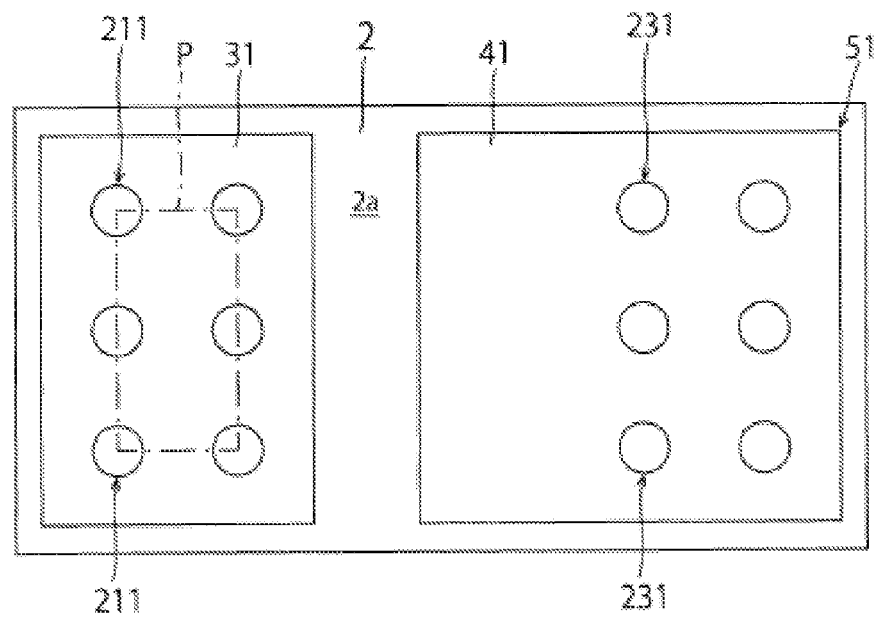
FIG. 4B is a top view to be used for describing a second process in the electrode forming step.

FIGS. 4A and 4B are a cross-sectional view and a top view to be used for describing the second process in the electrode forming step, respectively. As illustrated in FIGS. 4A and 4B, in the second process, an etching process is executed on metal foil sheet 51 and insulating substrate 2, whereby positive electrode connection layer 31 and negative electrode connection layer 41 are formed from metal foil sheet 51, and through hole of positive electrode connection layer 211, through hole of insulating substrate 221, through hole of negative electrode connection layer 231, and through hole of insulating substrate 241 are formed. In addition, an etching process is executed on metal foil sheet 52, whereby positive electrode terminal 32 and negative electrode terminal 42 are formed from metal foil sheet 52.

According to this exemplary embodiment, as illustrated in FIG. 4B (refer to also FIG. 2), six through holes of positive electrode connection layer 211 are formed in positive electrode connection layer 31. At this time, six through holes of positive electrode connection layer 211 are formed so that the edge of bottom surface 34b of pillow member 34 overlaps with centers of all through holes of positive electrode connection layer 211 when pillow member 34 is disposed in predetermined position P. More specifically, six through holes of positive electrode connection layer 211 are formed so that four corners 341 of bottom surface 34b overlap with the centers of four through holes of positive electrode connection layer 211, and two sides 342 of bottom surface 34b overlap with the centers of two through holes of positive electrode connection layer 211, respectively.

Figure 5:
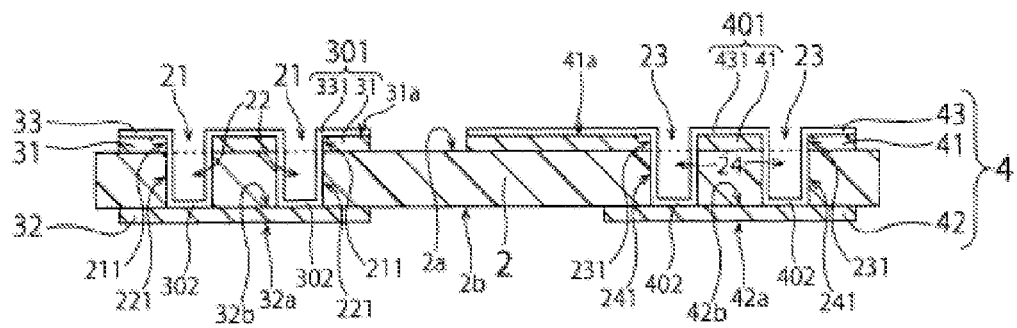
FIG. 5 is a cross-sectional view to be used for describing a third process in the electrode forming step.

FIG. 5 is a cross-sectional view to be used for describing the third process in the electrode forming step. As illustrated in FIG. 5, in the third step, a plating process is executed on main surface 31a of positive electrode connection layer 31, the inner surface of through hole of positive electrode connection layer 211, the inner surface of through hole of insulating substrate 221, and an exposed region in back surface 32b of positive electrode terminal 32 due to the formation of through hole of insulating substrate 221, whereby positive electrode plated layer 33 is formed. In this way, first positive electrode connection member 301 and second positive electrode connection member 302 are formed, first through holes 21 are formed in first positive electrode connection member 301, and first recessed portion 22 is formed in second positive electrode connection member 302. Furthermore, in the third process, a plating process is executed on main surface 41a of negative electrode connection layer 41, the inner surface of through hole of negative electrode connection layer 231, the inner surface of through hole of insulating substrate 241, and an exposed region in back surface 42b of negative electrode terminal 42 due to the formation of through hole of insulating substrate 241, whereby negative electrode plated layer 43 is formed. In this way, first negative electrode connection member 401 and second negative electrode connection member 402 are formed, second through holes 23 are formed in first negative electrode connection member 401, and second recessed portion 24 is formed in second negative electrode connection member 402. In addition, in the third process, plated layers may be formed on main surface 32a of positive electrode terminal 32 and main surface 42a of negative electrode terminal 42.

Figure 6A:
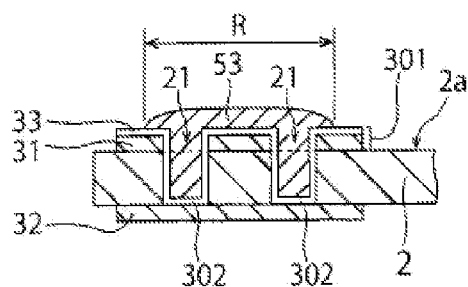
FIG. 6A is a cross-sectional view to be used for describing a fourth process in the electrode forming step.
Figure 6B:
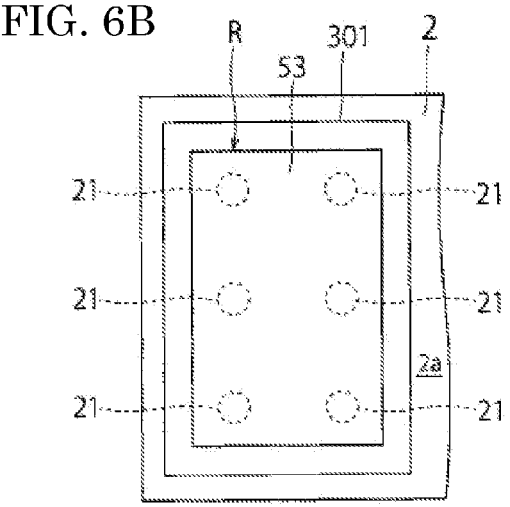
FIG. 6B is a top view to be used for describing a fourth process in the electrode forming step.

FIGS. 6A and 6B are a cross-sectional view and a top view to be used for describing the fourth process in the electrode forming step, respectively. As illustrated in FIGS. 6A and 6B, in the fourth process, bonding agent 53 containing the conductive material is applied to region R including the entire formation region of first through holes 21 in the main surface of first positive electrode connection member 301 (the main surface of positive electrode plated layer 33). According to this exemplary embodiment, solder paste containing solder powder and a flux is used as bonding agent 53.

Figure 7A:
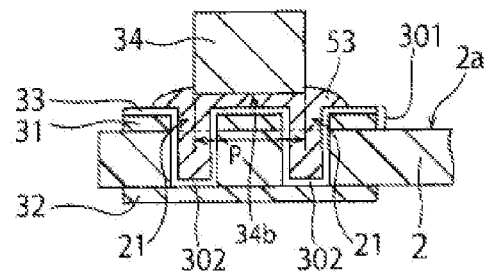
FIG. 7A is a cross-sectional view to be used for describing a fifth process in the electrode forming step.
Figure 7B:
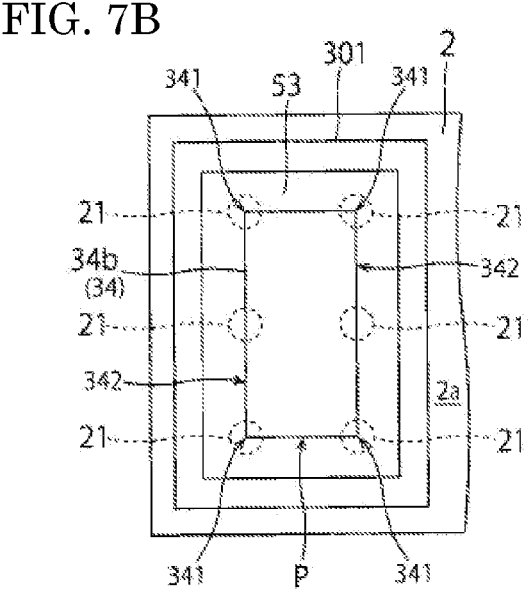
FIG. 7B is a top view to be used for describing a fifth process in the electrode forming step.
Figure 8:
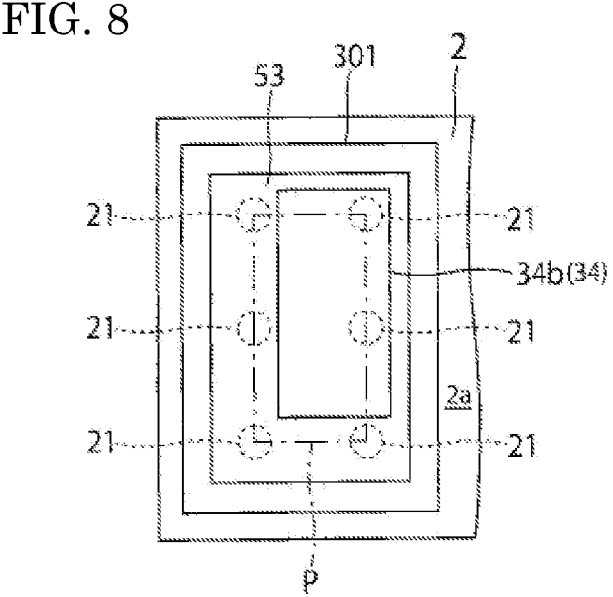
FIG. 8 is a top view illustrating a state in which a pillow member is displaced from a predetermined position in the fifth process.

FIGS. 7A and 7B are a cross-sectional view and a top view to be used for describing the fifth process in the electrode forming step, respectively. As illustrated in FIGS. 7A and 7B, in the fifth process, pillow member 34 is disposed on first positive electrode connection member 301, and bottom surface 34b of pillow member 34 comes in contact with bonding agent 53. At this time, four corners 341 of bottom surface 34b of pillow member 34 overlap with four first through holes 21 described in an upper part and a lower part of FIG. 7B among six first through holes 21. Furthermore, two sides 342 of bottom surface 34b of pillow member 34 overlap with two first through holes 21 described in a middle part of FIG. 7B. Thus, pillow member 34 is disposed in predetermined position P. However, in the fifth process, as illustrated in FIG. 8, the position of pillow member 34 could be displaced from predetermined position P. Here, according to this exemplary embodiment, as illustrated in FIG. 7B, first through holes 21 are disposed so that an area of a region surrounded by a line formed by connecting the centers of four first through holes 21 overlapping with corners 341 of pillow member 34 becomes equal to an area of bottom surface 34b of pillow member 34. Thus, this region makes predetermined position P.

Figure 9A:
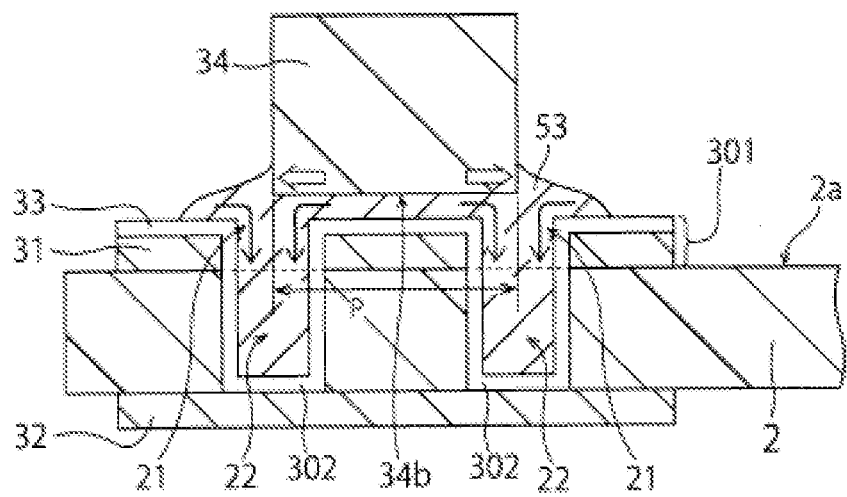
FIG. 9A is a cross-sectional view to be used for describing a sixth process in the electrode forming step.
Figure 9B:
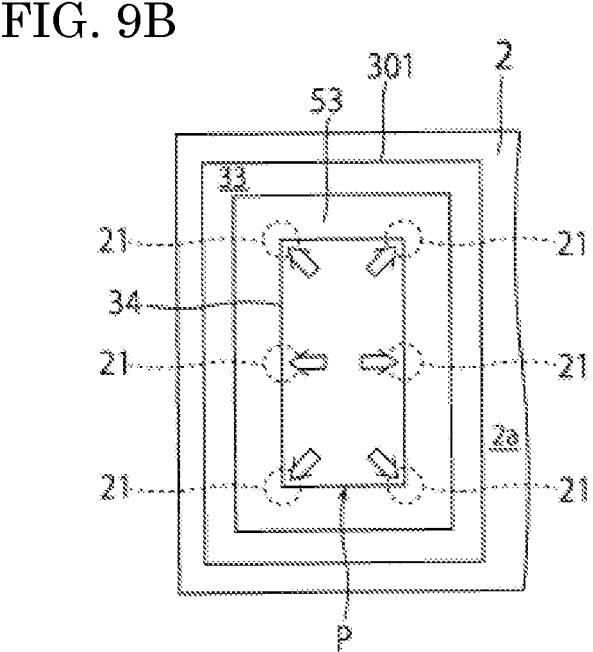
FIG. 9B is a top view to be used for describing a sixth process in the electrode forming step.

FIGS. 9A and 9B are a cross-sectional view and a top view to be used for describing the sixth process in the electrode forming step, respectively. In the sixth process, the solder powder and the flux in bonding agent 53 are melted by heating bonding agent 53. The melted solder aggregates, and gets wet and spreads along bottom surface 34b of pillow member 34 and the main surface of positive electrode plated layer 33. Here, the melted solder has high wettability especially with respect to positive electrode plated layer 33. Therefore, as illustrated by solid arrows in FIG. 9A, the melted solder gets wet and spreads along the main surface of positive electrode plated layer 33, and flows into first through holes 21 and an inside of first recessed portion 22 corresponding to first through holes 21. Consequently, the melted solder flows in bonding agent 53. Thus, due to this flow, pillow member 34 receives forces in various directions along the main surface of positive electrode plated layer 33 (the main surface of first positive electrode connection member 301). When the position of pillow member 34 roughly coincides with predetermined position P, as illustrated by outlined arrows in FIGS. 9A and 9B, the forces applied to pillow member 34 cancel each other out, and as a result, pillow member 34 is maintained in predetermined position P.

Figure 10:
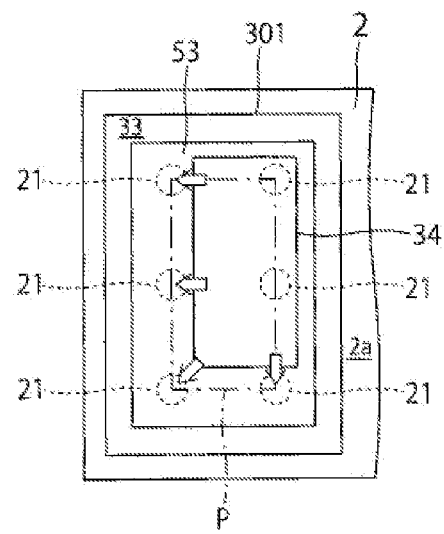
FIG. 10 is a top view illustrating a state in which the pillow member is drawn to the predetermined position in the sixth process.

Meanwhile, when the position of pillow member 34 is displaced from predetermined position P, a force applied in a direction displaced from predetermined position P is smaller than a force applied in its opposite direction as illustrated by outlined arrows in FIG. 10. As a result, pillow member 34 is drawn to predetermined position P, and the position of pillow member 34 roughly coincides with predetermined position P. That is, the position of pillow member 34 is prevented from being largely displaced from predetermined position P.

After that, the solder and the flux are solidified. Thus, positive electrode bonding member 35 is formed, and a preferable state of electrical connection can be formed between pillow member 34 and first positive electrode connection member 301. In addition, the position of pillow member 34 is fixed to predetermined position P or a position slightly displaced from predetermined position P. Furthermore, positive electrode bonding member 35 partially enters each of first through holes 21 and connected first recessed portions 22, so that an anchor effect is obtained, and as a result, bonding strength is improved between pillow member 34 and first positive electrode connection member 301.

The element disposing step is described with reference to FIG. 1. In the element disposing step, first, conductive paste 6 is applied to a main surface of first negative electrode connection member 401 (the main surface of negative electrode plated layer 43). Then, capacitor element 1 is disposed on upper surface 2a of insulating substrate 2. At this time, a posture of capacitor element 1 is adjusted so that the extending direction of positive electrode lead 12 becomes parallel to upper surface 2a. In this way, lead-out portion 12a of positive electrode lead 12 comes in contact with top surface 34a of pillow member 34, and negative electrode layer 15 comes in contact with conductive paste 6 on first negative electrode connection member 401. After that, a contact portion between positive electrode lead 12 and pillow member 34 is welded.

As described above, according to the manufacturing method in the first exemplary embodiment, the position of pillow member 34 is fixed to predetermined position P or the position slightly displaced from predetermined position P. Therefore, when capacitor element 1 is disposed on upper surface 2a of insulating substrate 2, positive electrode lead 12 can be surely in contact with pillow member 34. Therefore, a preferable connection state can be formed between positive electrode lead 12 and pillow member 34 after the welding process, and as a result, an electrical connection defect is hardly generated.

The step of forming the exterior body is described with reference to FIG. 1. In the step of forming the exterior body, exterior body 5 is molded on upper surface 2a of insulating substrate 2 with a resin such as an epoxy resin. More specifically, exterior body 5 is composed of a sealing material containing the epoxy resin (base compound), an imidazol compound (curing agent), and silica particles as a filler, and formed by transfer molding. Thus, capacitor element 1 is covered with exterior body 5. In this way, the solid electrolytic capacitor is completed. In addition, instead of the epoxy resin, a silicone resin may be used as the base compound of the sealing material.

Second Exemplary Embodiment

Figure 11:
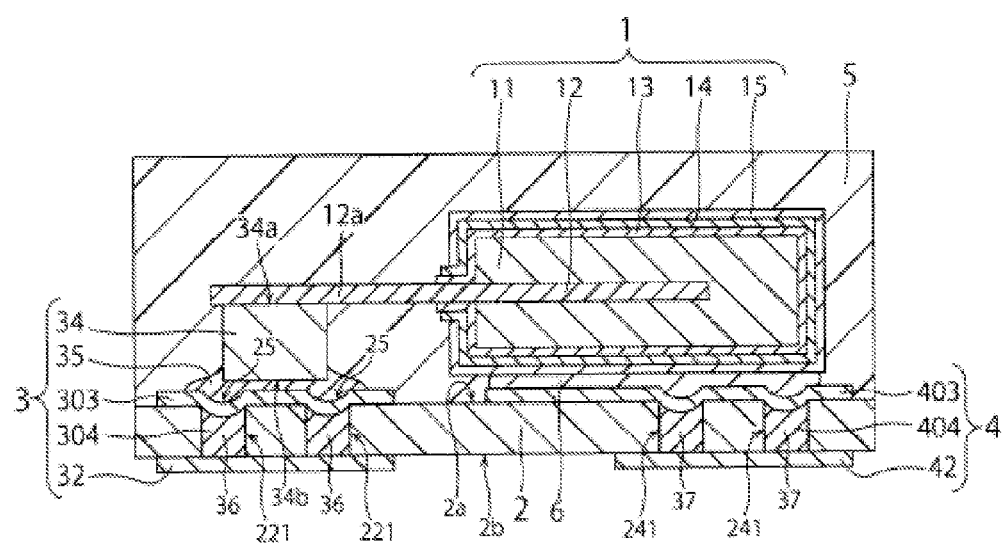
FIG. 11 is a cross-sectional view illustrating a solid electrolytic capacitor according to a second exemplary embodiment of the present disclosure.

FIG. 11 is a cross-sectional view illustrating a solid electrolytic capacitor according to a second exemplary embodiment of the present disclosure. Hereinafter, a description is given to positive electrode lead-out structure 3 and negative electrode lead-out structure 4, which are different from the configurations of the first exemplary embodiment, among configurations in this solid electrolytic capacitor. Since the other configurations are the same as those of the first exemplary embodiment, their descriptions are omitted.

According to the second exemplary embodiment, as illustrated in FIG. 11, positive electrode lead-out structure 3 has first positive electrode connection member 303 and second positive electrode connection member 304 which are different in configuration from first positive electrode connection member 301 and second positive electrode connection member 302 in the first exemplary embodiment. More specifically, second positive electrode connection member 304 is a positive electrode conductive via composed of conductive material 36 filling through hole of insulating substrate 221. Thus, a main surface of conductive material 36 recesses with respect to upper surface 2a of insulating substrate 2.

First positive electrode connection member 303 is a metal layer formed on upper surface 2a of insulating substrate 2 and the main surface of the conductive material 36. According to this exemplary embodiment, this metal layer is a conductive plated layer and has a recess on the main surface of conductive material 36. That is, first positive electrode connection member 303 has plurality of recessed portions 25 formed by locally recessing its main surface in positions on second positive electrode connection member 304 (positive electrode conductive via). In this way, according to the second exemplary embodiment, recessed portions 25 are formed instead of first through holes 21 in the first exemplary embodiment. Thus, the positional relation between pillow member 34 and first through holes 21 described in the first exemplary embodiment is directly applied to a positional relation between pillow member 34 and recessed portions 25 (refer to FIG. 2).

Positive electrode bonding member 35 partially enters recessed portions 25 and is in contact with corners 341 or sides 342 of bottom surface 34b of pillow member 34 in positions above recessed portions 25 (refer to FIG. 2).

In addition, first positive electrode connection member 303 may be a metal foil sheet or metal plate composed of a metal material such as copper. In this case, recessed portions 25 are formed by pressing the metal foil sheet or metal plate.

According to the second exemplary embodiment, as illustrated in FIG. 11, negative electrode lead-out structure 4 has first negative electrode connection member 403 and second negative electrode connection member 404 which are different in configuration from first negative electrode connection member 401 and second negative electrode connection member 402 in the first exemplary embodiment. More specifically, the second negative electrode connection member 404 is a negative electrode conductive via composed of conductive material 37 filling through hole of insulating substrate 241. First negative electrode connection member 403 is a plated layer formed on upper surface 2a of insulating substrate 2 and a main surface of conductive material 37.

Figure 12:
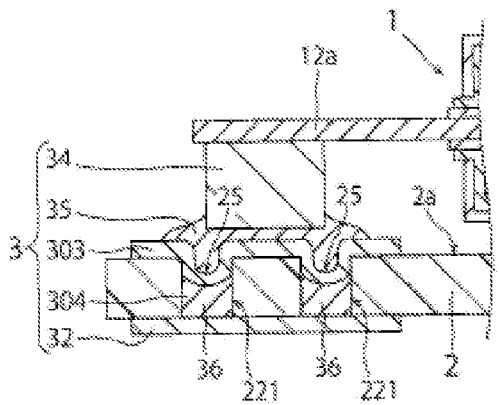
FIG. 12 is a cross-sectional view illustrating another example of a positive electrode lead-out structure in the solid electrolytic capacitor according to the second exemplary embodiment.

FIG. 12 is a cross-sectional view illustrating another example of positive electrode lead-out structure 3. As illustrated in FIG. 12, the main surface of conductive material 36 serving as second positive electrode connection member 304 may go downward from upper surface 2a of insulating substrate 2. According to this configuration, a depth of recessed portion 25 is increased.

Next, a method for manufacturing the solid electrolytic capacitor according to the second exemplary embodiment is described in detail. Hereinafter, a description is given to an electrode forming step, which is different in configuration from that of the first exemplary embodiment, among configurations in this manufacturing method. In addition, since other configurations are the same as those of the first exemplary embodiment, their descriptions are omitted.

According to the second exemplary embodiment, the electrode forming step is composed of first to seventh processes.

Figure 13:
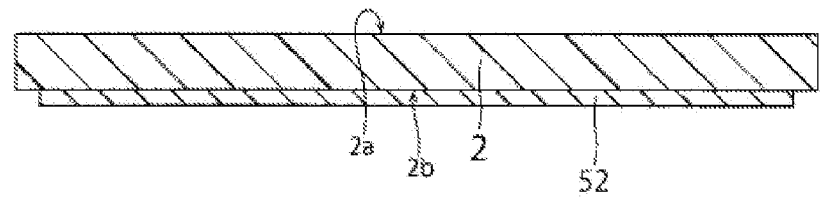
FIG. 13 is a cross-sectional view to be used for describing a first process in an electrode forming step to be executed by a method for manufacturing the solid electrolytic capacitor according to the second exemplary embodiment.

FIG. 13 is a cross-sectional view to be used for describing the first process in the electrode forming step. As illustrated in FIG. 13, in the first process, metal foil sheet 52 composed of a metal material such as copper is attached to lower surface 2b of insulating substrate 2. In addition, instead of metal foil sheet 52, a metal plate may be attached to lower surface 2b of insulating substrate 2.

Figure 14:
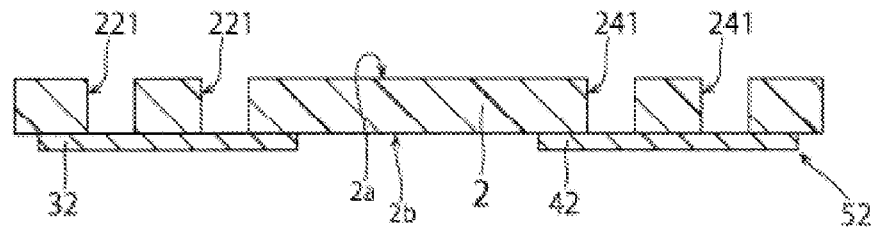
FIG. 14 is a cross-sectional view to be used for describing a second process in the electrode forming step.

FIG. 14 is a cross-sectional view to be used for describing the second process in the electrode forming step. As illustrated in FIG. 14, in the second process, an etching process is executed on insulating substrate 2, whereby through holes of insulating substrate 221 and through holes of insulating substrate 241 are formed. At this time, through holes of insulating substrate 221 are formed so that the edge of bottom surface 34b overlaps with centers of all through holes of insulating substrate 221 when pillow member 34 is disposed on predetermined position P (refer to FIG. 4B). In addition, an etching process is executed on metal foil sheet 52, whereby positive electrode terminal 32 and negative electrode terminal 42 are formed from metal foil sheet 52.

Figure 15:
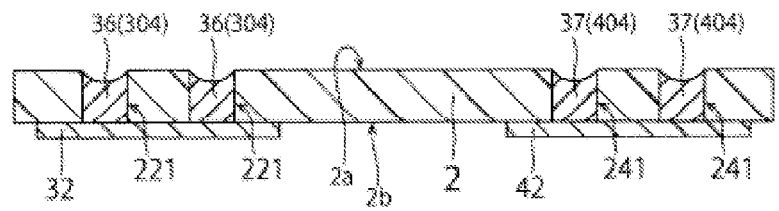
FIG. 15 is a cross-sectional view to be used for describing a third process in the electrode forming step.

FIG. 15 is a cross-sectional view to be used for describing the third process in the electrode forming step. As illustrated in FIG. 15, in the third process, through hole of insulating substrate 221 is filled with conductive material 36. At this time, by adjusting a filling amount of conductive material 36, the main surface of the filled conductive material 36 recesses with respect to upper surface 2a of insulating substrate 2, or goes downward from upper surface 2a. In addition, through hole of insulating substrate 241 is filled with conductive material 37. In this way, second positive electrode connection member 304 and second negative electrode connection member 404 are formed.

Figure 16:
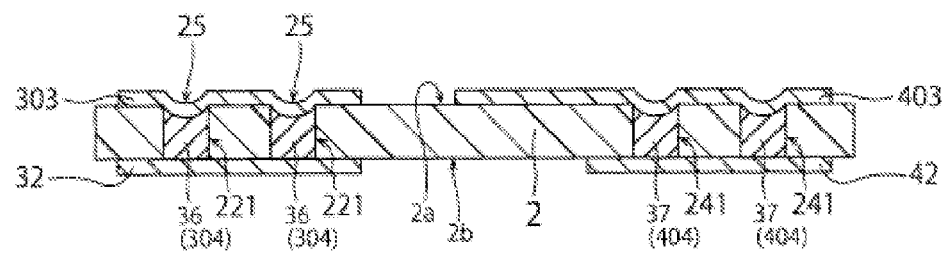
FIG. 16 is a cross-sectional view to be used for describing a fourth process in the electrode forming step.

FIG. 16 is a cross-sectional view to be used for describing the fourth process in the electrode forming step. As illustrated in FIG. 16, in the fourth process, a plating process is performed on upper surface 2a of insulating substrate 2 and the main surface of conductive material 36, whereby a plated layer is formed as first positive electrode connection member 303. At this time, a thickness of the plated layer is adjusted so that the main surface of the plated layer recesses on the main surface of conductive material 36. In this way, plurality of recessed portions 25 are formed in first positive electrode connection member 303. Furthermore, a plating process is executed on upper surface 2a of insulating substrate 2 and the main surface of the conductive material 37, whereby a plated layer is formed as first negative electrode connection member 403. In addition, first positive electrode connection member 303 may be formed such that a metal foil sheet is attached to upper surface 2a of insulating substrate 2 and the main surface of the conductive material 36, and then a plating process is executed on a main surface of the metal foil sheet. At this time, the metal foil sheet is formed along the recess of conductive material 36, whereby recessed portions 25 are formed in first positive electrode connection member 303. First negative electrode connection member 403 may be similarly formed.

Figure 17:
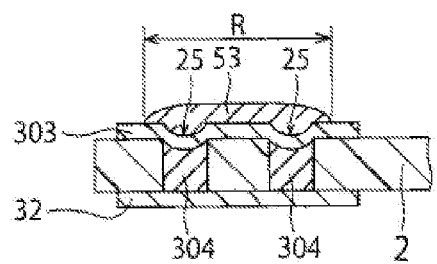
FIG. 17 is a cross-sectional view to be used for describing a fifth process in the electrode forming step.

FIG. 17 is a cross-sectional view to be used for describing the fifth process in the electrode forming step. As illustrated in FIG. 17, in the fifth process, bonding agent 53 containing the conductive material is applied to region R including the entire formation region of recessed portions 25 in the main surface of first positive electrode connection member 303. According to this exemplary embodiment, solder paste containing solder powder and a flux is used as bonding agent 53.

Figure 18A:
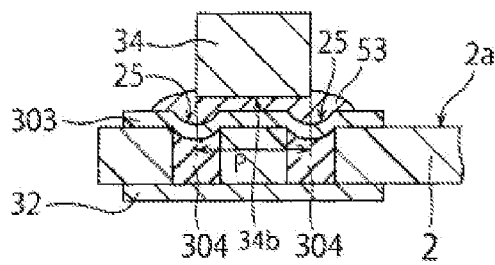
FIG. 18A is a cross-sectional view to be used for describing a sixth process of the electrode forming step.
Figure 18B:
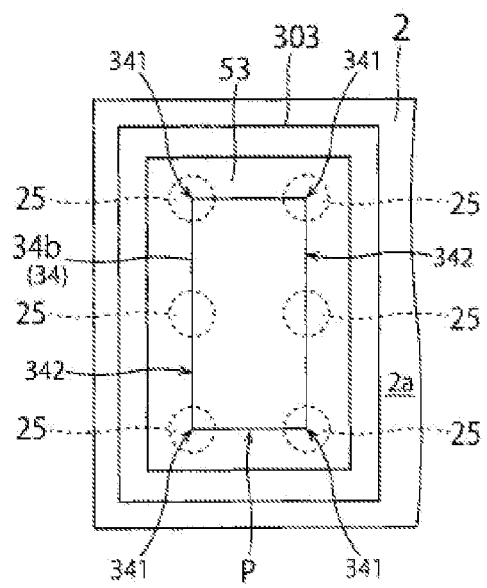
FIG. 18B is a top view to be used for describing a sixth process of the electrode forming step.

FIGS. 18A and 18B are a cross-sectional view and a top view to be used for describing the sixth process in the electrode forming step, respectively. As illustrated in FIGS. 18A and 18B, in the sixth process, pillow member 34 is disposed on first positive electrode connection member 303, and bottom surface 34b of pillow member 34 comes in contact with bonding agent 53. At this time, four corners 341 of bottom surface 34b of pillow member 34 overlap with four recessed portions 25 described in an upper part and a lower part of FIG. 18B among six recessed portions 25. Furthermore, two sides 342 of bottom surface 34b of pillow member 34 overlap with two recessed portions 25 described in a middle part of FIG. 18B. Thus, pillow member 34 is disposed in predetermined position P. In addition, according to this exemplary embodiment, as illustrated in FIG. 18B, recessed portions 25 are disposed so that an area of a region surrounded by a line formed by connecting centers of four recessed portions 25 overlapping with corners 341 of pillow member 34 becomes equal to the area of bottom surface 34b of pillow member 34. Thus, this region makes predetermined position P.

Subsequently, in the seventh process, the solder powder and the flux in bonding agent 53 are melted by heating bonding agent 53. In the seventh process, similar to the sixth process in the electrode forming step in the first exemplary embodiment, the melted solder gets wet and spreads along bottom surface 34b of pillow member 34 and the main surface of positive electrode plated layer 303, and flows into insides of recessed portions 25 (refer to FIG. 9B). Thus, the melted solder flows in bonding agent 53. As a result, pillow member 34 receives forces, and when the position of pillow member 34 is displaced from predetermined position P, pillow member 34 is drawn to predetermined position P. That is, the position of pillow member 34 is prevented from being largely displaced from predetermined position P.

After that, the solder and the flux are solidified. Thus, positive electrode bonding member 35 is formed, and a preferable state of electrical connection can be formed between pillow member 34 and first positive electrode connection member 303. In addition, the position of pillow member 34 is fixed to predetermined position P or a position slightly displaced from predetermined position P.

Therefore, according to the manufacturing method in the second exemplary embodiment, similar to the first exemplary embodiment, when capacitor element 1 is disposed on upper surface 2a of insulating substrate 2, positive electrode lead 12 can surely come in contact with pillow member 34. Thus, a preferable connection state is formed between positive electrode lead 12 and pillow member 34 after the welding process, and as a result, an electrical connection defect is hardly generated.

Figure 19:
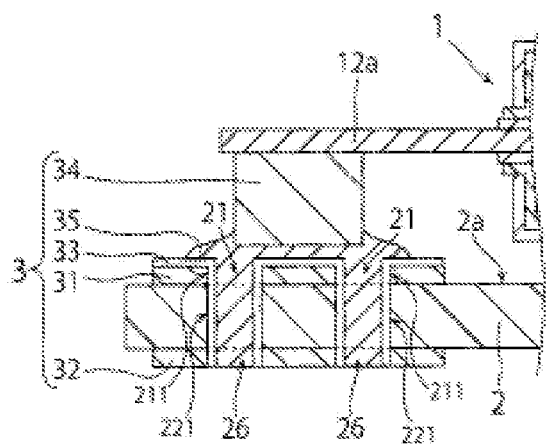
FIG. 19 is a cross-sectional view illustrating a variation of the positive electrode lead-out structure.

In addition, the configuration of each component in the present disclosure is not limited to the above exemplary embodiments, and the present disclosure can be modified in various ways within the technical scope described in claims. For example, as illustrated in FIG. 19, in the solid electrolytic capacitor according to the first exemplary embodiment, positive electrode terminal 32 may have through hole 26 linked to first through hole 21 by through hole of insulating substrate 221.

Figure 20:
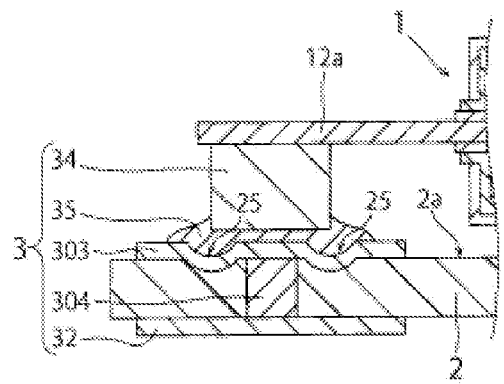
FIG. 20 is a cross-sectional view illustrating another variation of the positive electrode lead-out structure.
Figure 21:
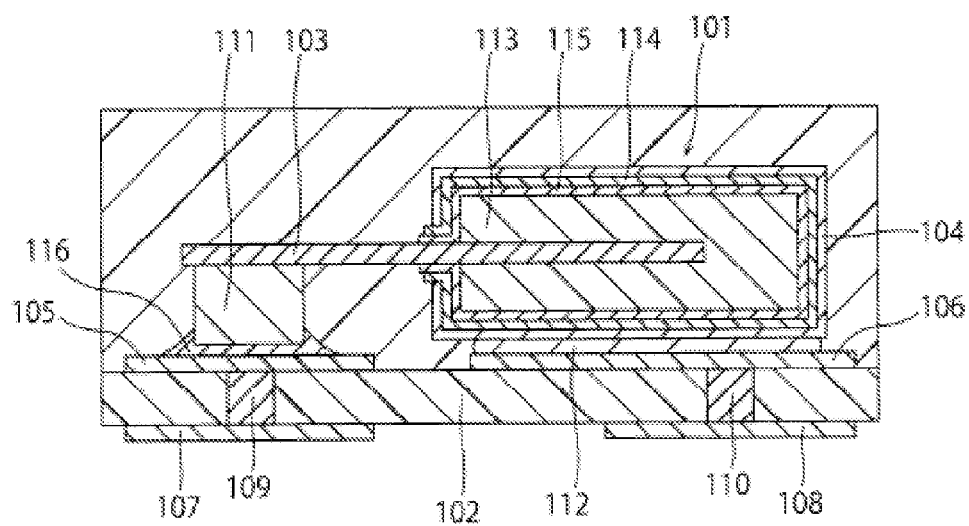
FIG. 21 is a cross-sectional view illustrating an example of a conventional solid electrolytic capacitor.

According to the first exemplary embodiment, first through hole 21 is formed above the positive electrode conductive via serving as second positive electrode connection member 302. According to the second exemplary embodiment, recessed portion 25 is formed above the positive electrode conductive via serving as second positive electrode connection member 304. However, the present disclosure is not limited to these configurations. For example, as illustrated in FIG. 20, first positive electrode connection member 303 may have recessed portions 25 or through holes in positions different from the position above the positive electrode conductive via. According to an example illustrated in FIG. 20, recesses are formed in positions different from the formation position of the positive electrode conductive via (second positive electrode connection member 304), in upper surface 2a of insulating substrate 2. Then, first positive electrode connection member 303 is formed along the recesses, whereby recessed portions 25 are formed. In addition, recessed portions 25 may be formed such that after first positive electrode connection member 303 has been formed, a pressing process is executed for first positive electrode connection member 303.

According to the above exemplary embodiments, bonding agent 53 used for forming positive electrode bonding member 35 is the solder paste containing the solder powder and the flux. However, the present disclosure is not limited to this configuration. Bonding agent 53 may contain various kinds of conductive materials other than the solder. However, the conductive material preferably has wettability with respect to first positive electrode connection member in a melted state, so that the solder is especially preferable.

What is claimed is:
1. A solid electrolytic capacitor comprising:
an insulating substrate having an upper surface and a lower surface;
a capacitor element having a positive electrode member, a negative electrode member, and a dielectric member, and disposed on the upper surface of the insulating substrate;
a positive electrode lead-out structure having a positive electrode terminal formed on the lower surface of the insulating substrate, and electrically connected to the positive electrode member of the capacitor element; and
a negative electrode lead-out structure having a negative electrode terminal formed on the lower surface of the insulating substrate, and electrically connected to the negative electrode member of the capacitor element,
wherein the positive electrode lead-out structure further comprises:

a first positive electrode connection member having a main surface and a back surface, of which the back surface is in contact with the upper surface of the insulating substrate, a second positive electrode connection member configured to electrically connect the first positive electrode connection member to the positive electrode terminal, a pillow member having a top surface and a bottom surface, and configured to electrically connect the positive electrode member of the capacitor element to the first positive electrode connection member, and a positive electrode bonding member configured to bond the pillow member to the first positive electrode connection member, wherein the first positive electrode connection member has a recessed portion formed by locally recessing the main surface, or a through hole penetrating from the main surface to the back surface, the recessed portion or the through hole overlaps an edge of the bottom surface of the pillow member so as to have a first end of the recessed portion or the through hole disposed outside the edge and a second end of the recessed portion or the through hole disposed inside the edge, and the positive electrode bonding member partially enters the recessed portion or the through hole, and is in contact with an edge of the bottom surface of the pillow member at a position above the recessed portion or the through hole, or at a nearby position.

2. The solid electrolytic capacitor according to claim 1, wherein
the bottom surface of the pillow member has a polygonal shape having plural corners, and
the recessed portion or the through hole is formed in the first positive electrode connection member at a position that overlaps with the corner with respect to at least two corners of the plural corners.

3. The solid electrolytic capacitor according to claim 1, wherein
the bottom surface of the pillow member has a polygonal shape having plural sides, and
the recessed portion or the through hole is formed in the first positive electrode connection member at a position that overlaps with the side with respect to at least two sides of the plural sides.

4. The solid electrolytic capacitor according to claim 1, wherein
the second positive electrode connection member is a conductive via penetrating the insulating substrate from the upper surface to the lower surface, and
the recessed portion or the through hole is formed above the conductive via.

5. A method for manufacturing a solid electrolytic capacitor comprising
an insulating substrate having an upper surface and a lower surface; a capacitor element having a positive electrode member, a negative electrode member, and a dielectric member, and disposed on the upper surface of the insulating substrate; a positive electrode lead-out structure having a positive electrode terminal formed on the lower surface of the insulating substrate, and electrically connected to the positive electrode member of the capacitor element; and a negative electrode lead-out structure having a negative electrode terminal formed on the lower surface of the insulating substrate, and electrically connected to the negative electrode member of the capacitor element, wherein the positive electrode lead-out structure further comprises: a first positive electrode connection member having a main surface and a back surface, of which the back surface is in contact with the upper surface of the insulating substrate, a second positive electrode connection member configured to electrically connect the first positive electrode connection member to the positive electrode terminal, a pillow member having a top surface and a bottom surface, and configured to electrically connect the positive electrode member of the capacitor element to the first positive electrode connection member, and a positive electrode bonding member configured to bond the pillow member to the first positive electrode connection member, wherein the first positive electrode connection member has a recessed portion formed by locally recessing the main surface, or a through hole penetrating from the main surface to the back surface, and the positive electrode bonding member partially enters the recessed portion or the through hole, and is in contact with an edge of the bottom surface of the pillow member at a position above the recessed portion or the through hole, or at a nearby position, the method comprising the steps of:

applying a bonding agent containing a conductive material, on the main surface of the first positive electrode connection member;

disposing the pillow member on the first positive electrode connection member, bringing the bottom surface of the pillow member into contact with the bonding agent, and overlapping an edge of the bottom surface of the pillow member with the recessed portion or the through hole; and melting the conductive material by heating the bonding agent to form the positive electrode bonding member, wherein the recessed portion or the through hole has a first end disposed outside the edge and a second end disposed inside the edge.

6. The method for manufacturing a solid electrolytic capacitor according to claim 5, wherein
in the step of applying the bonding agent, the conductive material having wettability in a melted state to the first positive electrode connection member is used.

* * * * *